United States Patent Office 3,162,573
Patented Dec. 22, 1964

3,162,573
INTERNAL TREATMENT OF ANIMALS WITH RESIN BIOCIDAL COMPOSITIONS
Robert J. Geary, Vero Beach, Fla., assignor to Plants Products Corporation, Long Island, N.Y., a corporation of New York
No Drawing. Filed Oct. 14, 1959, Ser. No. 846,276
14 Claims. (Cl. 167—53)

This invention relates to biological processes and in particular to methods for the treatment by way of control and/or destruction of various diseases resulting from various parasites, insects, bacteria, fungi, and the like, and for the control and/or destruction of the aforementioned types of pests which infest animals and particularly the domesticated animals such as horses, cows, dogs, cats and the like.

It is well recognized that among the various compounds and compositions which are employed as insecticides, fungicides, bacteriocides, acaracides, anthelmintics, and the like, a great number, if not the major portion thereof, are extremely poisonous materials. There is not only danger to the host to be treated but there is considerable danger, in many instances to the user of the biological due to the extreme toxicity thereof. An added disadvantage of most of the aforementioned biologicals lies in the relatively short active life thereof, necessitating constant treatment as well as constant precautions against overdosage.

It is therefore an object of this invention to provide methods for the treatment of various animal infestations.

It is another object of this invention to provide processes for the control and/or destruction of parasites and pests which normally afflict animals and in particular domestic animals.

It is a still further object of this invention to provide processes for the treatment of domestic animals such as horses, mules, cows, dogs and the like which are afflicted with various parasites and pests.

It is still another object of this invention to provide processes for controlling and/or destroying selected pests afflicting domestic animals.

Other objects will appear hereinafter as the description proceeds.

The ends and objects to which the present invention is directed are attained by the treatment of the animal for the particular infestation with the biological normally selected for such treatment and/or control, the said biological however being in a particular state of combination with a selected class of resinous materials, whereby, as pointed out above the disadvantages in the use of the selected biological which are usually attendant therewith are overcome, and the toxicity to the host or animal undergoing treatment is greatly reduced. By combining the active biological and the resin in the manner hereinafter to be described, in addition to any other additives, diluents and the like it may be desirable or feasible to employ, there is obtained a unique combination of safety and outstanding pest control and/or destruction.

The resinous materials which are herein contemplated are designated as amido (including amino)-aldehyde resins and include the following types as exemplifying the general class:

Urea-formaldehyde
Melamine-formaldehyde
Guanidine-formaldehyde
Dicyandiamide-formaldehyde
Biuret-formaldehyde
Cyanamide-formaldehyde
Dicyandiamidine-formaldehyde
Thiourea-formaldehyde
Urea-thiourea-formaldehyde
Urea-melamine-formaldehyde In addition to the amines or amides exemplified above other substituted forms thereof may be used, as, for example, Alkyl ureas, e.g. methyl urea, ethyl urea, etc.
Aryl ureas, e.g. phenyl urea, unsym. diphenyl urea, etc.
Alkyl aryl ureas, e.g. unsym. methyl phenyl urea, etc.
Alkyl thioureas
Aryl thioureas
Alkyl aryl thioureas
Alkyl and aryl guanidines, e.g. diphenyl guanidine
Alkyl melamines, e.g. 2,4,6-triethyltriamino-1,3,5 triazine
Aryl melamines, e.g. 2,4,6-triphenyltriamino-1,3,5 triazine It is, of course, understood that mixtures of the aforementioned amino or amido compounds may be used to obtain resins of varying physical and chemical characteristics.

In addition to formaldehyde as the source of the aldehyde moiety, other aldehydes may be used in admixture therewith or in lieu thereof. Such aldehydes include:

Paraformaldehyde
Acetaldehyde
Hexamethylenetetramine
Butyraldehyde
Crotonaldehyde
Benzaldehyde
Furfural, and the like Various modifying agents well known in the resin art may be admixed or reacted with any of the above described condensation products. As modifying agents, there may be employed monohydric alcohols, e.g. ethyl, propyl, isopropyl, butyl, amyl, nonyl, decyl, tridecyl alcohols etc., polyhydric alcohols, e.g. ethylene glycol, diethylene glycol, glycerine, 1,4-butanediol, pentaerythritol, etc., amides, e.g. formamide, acetamide, stearamide, benzamide, toluene sulphonamides, etc., amines, such as ethylene diamine, aniline, phenylene diamines, natural gums and resins such as shellac, rosin, rosin esters and other rosin derivatives, gelatin, alginates, cellulose esters and ethers, dyes, pigments, fillers, plasticizers and the like. There may also be added or interacted fatty acids and oils such as oleic, linoleic, etc., as well as other acids of the aliphatic and aromatic series as for example: succinic acid, malonic acid, suberic acid, sebasic acid, adipic acid, phthalic acid, terephthalic acid, phenols, naphthols, and the like.

I have discovered that by combining the biologically active material with the resin-forming constituents there is obtained an occlusion or fusion of the active principle with the resin to form a "clathrate" compound. This combination is essentially, in its physical form, sieve-like or sponge-like in structure, with the molecules of the active biological fitted into the inter-spaces of the polymer. By virtue of the strong physico-chemical forces between the resin and the biological compound, it is possible to employ as the biological substance highly volatile compounds and even gases, and in the occluded combination, very favorable properties are forthcoming in the control of pests of animals. Thus the biological can be displaced from the polymer and thereby made available as an active biological principle by the proper addition or treatment of other compounds, preferably in the liquid or gaseous stage. By the employing of such combinations of active principle and resin as herein taught in an environment where there is present a substance to displace the biological, the latter becomes immediately available in active form. This is to be contrasted with a resin-coated active principle which requires a break-down or degradation of the resin before the active biological becomes available.

The invention as herein described may employ any biologically active material or composition and, in particular, insecticides, fungicides, nematocides, and other biocides, and the like, which are utilized in an environment which will promote the activation thereof as above described. Among the biologicals which are contemplated, mention may illustratively be made of the following:

DDT
Chlordan
Dieldrin
TDE (dichlorodiphenyl dichloroethane)
Methoxychlor
Heptachlor
Gamma benzene hexachloride
Isolan (1-isopropyl-3-m-ethyl pyrazolyl-5-dimethyl carbamate)
3-methyl-pyrazolyl dimethylcarbamate
Aldrin (1,2,3,4,10,10-hexachlore-1,4,4a,5,8,8a-hexahydro-1,4-endo-exo-5,8-dimethanonaphthalene)
Endrin (1,2,3,4,10,10-hexachloro-6,7-epoxy-1,4,4a,5,6 7,8,8a-octahydro-1,4-endo-endo-5,8-dimethanonaphthalene)
Isodrin (1,2,3,4,10,10-hexachloro-1,4,4a,5,8,8a-hexahydro-1,4-endo-5,8-dimethanonaphthalene)
Maneb (manganese ethylene bisdithiocarbamate)
Zineb (zinc analog of maneb)
Nabam (disodium analog of maneb)
Ferbam (ferric dimethyl dithiocarbamate)
Ziran (zinc analog of ferbam)
Captan (N-trichloromethylmercapto-4-cyclohexane-1,2-dicarboximide)
Karathane (2,4-dinitro-6-capryl phenol crotonate)
Aramite (butyl phenoxyisopropyl chloroethyl sulfite)
Ovotran (p-chlorophenyl-p-chlorobenzenesulphonate)
Sulphenone (p-chlorodiphenyl sulphone)
Dichlorophenyl benzenesulphonate
Parathion
Dimethyl parathion
Demeton (O,O-diethyl-O-2-ethylmercaptoethyl thiophosphate)
Octamethyl pyrophosphoramide
O,O-diethyl bis(dimethylamide) pyrophosphate, sym., and unsym.
Diethoxythiophosphoryl tetramethyl-diamido phosphate
Decamethylpentamido triphosphate
Alpha-diethoxyphosphinodithioacetylurea
Alpha-dimethoxyphosphinodithioacetylurea
Diethoxyphosphinodithioacetamide
Dimethoxyphosphinodithioacetamide
Bis(dimethylamido) phosphoryl fluoride
Bis(dimethylamido) phosphoryl axide
2-chlorovinyl diethyl phosphate
Sodium selenate
Potassium selenate
Sodium fluoroacetate
2,4-D
2,4,5-T
Chloro IPC
Phenyl mercuric acetate
Nemagon (1,2-dibromo-3-chloropropane)
Cadmium chloride
Diuron
Monuron
Simazine
Dalapon
EPTAM (ethyl N,N-di-n-propyl-thiocarbamate)
Aminotriazole
Thimet (O,O-diethyl-S-(ethylthiomethyl)phosphoro-dithioate)
Dowco 109 (O-(4-tert. butyl-2-chlorophenyl)O-methyl methyl phosphoro-amidothionate) and its oxygen analog
Various biologically active inorganic salts of metals such as copper, silver, chromium, mercury, etc.

The amounts of biological and resin may be varied considerably depending upon the particular agents employed. Thus, with the highly toxic biologically active materials more resin is preferred. In general, it will be found that for the preponderance of biologicals, there may be used for each part thereof, from about 0.2 to 50 parts of resin and the preferred range is from about 1 to 20 parts of resin per part of biological.

The following examples will serve to illustrate the present invention without being deemed limitative thereof. Unless otherwise indicated, parts and proportions referred to herein are by weight.

*Example 1*

10 parts Dowco 109 is mixed together with 7.2 parts of 40% aqueous formaldehyde and 4 parts urea and 0.1 part of 85% phosphoric acid. The polymerized mass is then finely ground in a mill and is found to be admirably suited for use in the rumen of cattle for parasitic control and/or destruction.

*Example 2*

A mixture of 3 parts dipterex (O,O-dimethyl 1-hydroxy-2,2,2-trichloroethyl phosphonate), 10 parts 37% aqueous formaldehyde and 5 parts urea is prepared and 0.1 part 85% phosphoric acid is then added to effect polymerization. A hard, glass-like product results which is water-insoluble but is nevertheless outstandingly effective as a pesticide.

*Example 3*

The product of Example 2 is ground to a fine powder and added to a sugar solution. House flies feeding on this sugar solution are killed instantly.

*Example 4*

The following composition is prepared and polymerized 10 parts 37% aqueous formaldehyde
15 parts urea
15 parts Bayer L 13/59 (same parasiticidal component as Dipterex)
0.3 part 85% phosphoric acid The polymerized product is finely ground, divided into 2 aliquot portions and molded into 2 capsules.

*Example 5*

The two capsules of Example 4 were given orally to a Jersey calf, 3 months old, weighing 120 pounds. The lethal dose of the Bayer parasiticide was previously determined to be 50 mg./kilogram. The calculated dose of the 2 capsules is found to be 140 mg./kilogram, yet the calf showed almost complete absence of poisoning or toxicity. Some slight increase in defecation was observed. Samples of blood were taken hourly for the first 5 hours to ascertain choline esterase readings. Within the first hour indications were of a 10% depression from the normal in red blood cell choline esterase. There continued to be a decline over 4 hours to a level of 30% of the normal. The reading remained at this level for 12 more hours and after 18 hours it began to climb, indicating that the calf was metabolizing the poison faster than it was being released from the polymer combination. Thereafter the calf continued normal without any apparent or visible after affects.

A similar experiment using 100 mg./kilogram of the same biological, but not in polymer combination, produced severe poisoning symptoms within 45 minutes and the calf was almost dead in one hour. Past experience indicates death would have occurred except that atropine was injected at the rate of 10 mg./kilogram intravenously and 30 mg./kilogram intramuscularly. The calf recovered. Red blood cell choline esterase readings indicated a drop to 10% of normal which accounted for the poisoning symptoms.

Example 6

This example demonstrates the in situ formation of the polymer-biological combination.

The following mixture is prepared 5 parts urea
5 parts paraldehyde
10 parts propylene glycol
10 parts dimethoate and sprayed onto the hairs of a cow. After a few minutes the surface is then sprayed with a 5% acetic acid solution to catalyze the polymer formation. The resultant pesticide-resin combination adheres very strongly to the hairs and skin of the animal and gives residues of insecticide activity for much longer periods (ca. 3×) than normally is obtained with this pesticide.

In place of acetic acid, other weak acids may be used e.g. lactic acid, etc., and in many instances none is needed due to the acidic nature of the animal's skin.

Example 7

The composition of this example is outstanding for the control of screw worms. The latter infests wounds in animals, laying their eggs in such wounds so deeply that the animal cannot lick them out of the wound. In a few days (usually less than two), the eggs hatch producing thousands of larvae, that literally eat the animal alive. If the wound is in a vital spot the infestation will kill it or deform it for life. The usual remedies are the so-called "smears" which are thick pastes rubbed directly into the wound. The following formulation is outstanding for such a purpose:

2 parts Dowco 109
8 parts formalin-37%
5 parts urea 0.5 part 85% phosphoric acid to catalyze polymer formation at ambient temperature. The polymer is then ground into a fine powder, and then 1% by weight of methyl cellulose and sufficient water are added to make a thick paste. This paste is applied directly on the wound and gives excellent results.

Example 8

A composition of the following ingredients is prepared:

8 parts formalin-37%
5 parts urea
10 parts acetone
5 parts Bayer 21/199 (O,O-diethyl-O-3-chloro-4-methyl-1-oxo-2H-1-benzopyran-7-yl phosphorothioate)
1 part lactic acid Polymerization is effected at room temperature and the product is then ground with 0.5% by weight of Vatsol OTB (dispersing agent). Upon dilution with water this concentrate may be sprayed directly on the wounds of animals e.g. newly shorn sheep having many surface scratches.

Example 9

For dusting of cattle having light wounds the following is an admirable formulation:

8 parts 37% formalin
5 parts urea
10 parts lindane
10 parts cyclohexanone
2 parts 5% acetic acid After polymer formation is effected at room temperature, the product is ground and mixed with talc as a diluent to give a final active principal concentration of 1%.

Example 10

This composition illustrates the application to the animal by means of the aerosol technique.

8 parts 37% formalin
5 parts urea
20 parts Sevin (1-naphthyl-N-methyl carbamate)
10 parts dimethylformamide
0.5 parts 50% sulphuric acid catalyst The polymerized product is then compounded as follows:

20 parts polymer product
80 parts Freon mixture comprising 50% $CCl_3F$ and 50% $CCl_2F_2$ In addition to the use for the control of screw worms the formulations of Examples 7–10 may also be used in the control of other animal ecto-parasites such as stable fles, mosquitoes, horse flies, and the like.

Example 11

This example illustrates the control of the cattle grub *Hypoderma bovis* and *Hypoderma lineatum*. The source fly lays eggs on the animal (usually on the heel and therefore the name "heel fly"). The animal licks the eggs, and in the throat of the animal the eggs hatch into a larvae, which immediately bores into the surrounding tissue. The larvae travels through the body of the animal to the back where it emerges as a worm about ½ inch long, leaving a hole in the hide, and causing irritation and damage to the flesh. The following composition gives excellent control upon oral administration to the cattle.

8 parts 37% formalin
5 parts urea
10 parts acetone
10 parts Dowco 109

Polymerization is carried out with 0.4 part of 85% phosphoric acid, and the product after grinding is pressed into pellets for direct oral administration. The finely divided product can be administered by an alternative drenching method, wherein 1 part of product is admixed with 0.2 part bentonite, 0.03 part white flour and 3 parts of water.

Various trace minerals may be added to the formulations herein described for the purpose of supplying such metals to animals which may have a dietary deficiency thereof. The metals include cobalt sulphate, ferrous chloride, molybdenum salts, and the like.

In lieu of the Dowco 109 of Example 11, one may use Bayer L 13/59, Bayer 21/199, dimethoate, DDVP, sulfotepp, the methyl analog of sulfotepp, or any of the other organo phosphates, thiophosphates, or the corresponding phosphates.

Example 12

Outstanding results are also achieved in the treatment of the endo-parasites, such as round worms, hook worms and the like. The high bacterial and fungal activity of the ruminates and many other animals and often the high acid content or high body temperature (e.g. chickens) often decompose many compounds which are normally effective in vitro, but because of such decomposition are ineffective in vivo. The compositions employed in the processes of this invention permit the attainment of constant low level, sustained concentrations of biologically active compound in the infected tissues, and is often recirculated through the blood stream. The following is a particularly effective one:

8 parts 37% formalin
5 parts urea
5 parts ethanol
15 parts Bayer L 13/59
0.2 part 70% phosphoric acid Polymerization is carried out at ambient temperature or at slightly elevated temperatures in a mold whereby pellet may be formed directly and used as such for treatment.

*Example 13*

Phenothiazine is widely used for the control of endoparasites of animals. The effectiveness thereof is known to be due to the conversion to other compounds. By the use of combinations herein disclosed, low level, sustained treatment is obtained with better effectiveness and tolerance by the animal. The following is an illustrative formulation:

8 parts 37% formalin
5 parts urea
15 parts phenothiazine

After polymer formation using 0.3 part of 70% phosphoric acid catalyst, the material is ground to a fine powder, mixed with water, and bentonite as a suspending agent, and given orally. As pointed out above various metals may be added to the biocidal compositions for dietary deficiency neutralization; alternatively, these metals may be directly bound into the resins with the biological and be released along therewith over a longer period of time. The following example describes such a combination.

*Example 14*

A mixture of the following ingredients is prepared:

8 parts 37% formalin
5 parts urea
10 phenothiazine
0.001 part cobalt sulphate
0.004 part copper sulphate
0.01 part ferrous sulphate To the above mixture there is added 0.3 part of 50% sulphuric acid catalyst, and polymerization is carried out at 30° C. The polymer product is ground and may be handled as above, either as a suspension in water or as a pellet or capsule. The aqueous suspensions may be administered as a drench or orally and the pellets with an appropriate "balling gun."

*Example 15*

This formulation represents one which gives a sustained low-level release into the intestines and blood stream of the animal for endo- and ecto-parasitic control:

8 parts 37% formalin
5 parts urea
15 parts Bayer L 13/59
0.5 part metallic cobalt
3 parts colloidal iron powder After polymerization with 0.5 part of 50% sulphuric acid, the product is ground and pressed into pellets. This composition may be held in the rumen by having present at the same time a permanent magnet, thus preventing the so-called "hardware disease" or ruminants.

*Example 16*

The procedure of Example 1 is again repeated employing in lieu of urea, molecularly equivalent amounts of the following combinations.

(A) Urea-melamine (1:1)
(B) Melamine
(C) Dicyandiamide
(D) Urea-thiourea-dicyandiamide (1:1:1)
(E) Urea-guanidine (1:1)
(F) Urea-ethyl urea (5:1)

*Example 17*

A composition comprising:

8 parts 37% aqueous formaldehyde
5 parts urea
15 parts captan (300 mesh)

is prepared and then 1 part lactic acid is added to effect polymerization. The polymer is then ground, pressed into a bolus, and used to control the flora in the rumen of cattle.

*Example 18*

A mixture comprising the following ingredients is prepared:

10 parts 40% aqueous formaldehyde
5 parts urea
1 part methyl urea
10 parts Terramycin (oxytetracycline hydrochloride)
1 part lactic acid Polymer formation results at room temperature within a short time. The material is crushed and formed into pills or placed into capsules. Excellent sustained action against bacterial and protozoan infections is achieved.

*Example 19*

Example 18 is repeated except that in place of the mixture of urea and methyl urea, 5 parts of urea are used, and additionally, 5 parts of ethanol are added.

*Example 20*

This example illustrates a low-level, sustained, effective composition useful in the control of cattle grubs and some blood-sucking endo and ecto-parasites by subcutaneous injection thereof.

5 parts of urea are dissolved in 5 parts of propylene glycol, and then 3 parts of paraldehyde are added with vigorous stirring. After 30 minutes, 10 parts of dimethoate are added together with 0.2 part of lactic acid. After polymer formation is complete, the material is ground up to a fine powder and suspended in distilled, sterile water for injection.

*Example 21*

Another suitable injectable formulation is:

8 parts 37% formalin
5 parts urea
15 parts tertiary butyl alcohol
10 parts penicillin hydrochloride
0.1 part lactic acid A polymer readily ensues, which after grinding to a colloidal form is suspended in sterile, distilled water, and injected into the animal.

While this invention has been disclosed with respect to certain varying modifications and preferred embodiments, other variations, modifications, and embodiments thereof will be obvious and apparent to those persons skilled in the art. It is to be understood that such variations, modifications, and embodiments are to be included within the spirit and purview of this application and the scope of the appended claims.

I claim:

1. A method for the control of animal pests which comprises treating the animal pest internally with a composition comprising an amido-aldehyde resin having molecularly occluded therein a biocide effective against said pest, said composition being produced by the action of an acid catalyst on a substantially homogeneous mixture of said biocide and monomeric amido and monomeric aldehyde reactants capable of forming said resin in the presence of said catalyst.

2. A method as defined in claim 1 wherein the composition is applied orally to the animal.

3. A method as defined in claim 1 wherein the composition is applied by subcutaneous injection.

4. A method for treatment of animals afflicted with a pest which comprises treating the animal internally with a composition comprising an amido-aldehyde resin having molecularly occluded therein from about 0.02 to about 5 parts of a biocide effective against said pest for each part of resin, the said composition being produced by the action of an acid catalyst on a substantially homogeneous mixture of said biocide and monomeric amido and monomeric aldehyde reactants capable of forming said resin in the presence of said catalyst.

5. A method as defined in claim 4 wherein the resin is a urea-formaldehyde resin.

6. A method as defined in claim 4 wherein the resin is a urea-guanidine-formaldehyde resin.

7. A method as defined in claim 4 wherein the resin is a urea-thiourea-formaldehyde resin.

8. A method as defined in claim 4 wherein the resin is a dicyandiamide-formaldehyde resin.

9. A method as defined in claim 4 wherein the resin is a urea-methyl urea-formaldehyde resin.

10. A method as defined in claim 4 wherein the resin is a melamine-formaldehyde resin.

11. A method as defined in claim 4 wherein the composition contains trace metals.

12. A method as defined in claim 4 wherein the biocidal composition is applied to a ruminant.

13. A method as defined in claim 4 wherein the composition contains a magnetic material.

14. A method as defined in claim 13 wherein the magnetic material is iron, and the composition is applied orally to a ruminant.

References Cited in the file of this patent
UNITED STATES PATENTS

| | | |
|---|---|---|
| 2,318,121 | Widmer | May 4, 1943 |
| 2,452,054 | Jones | Oct. 26, 1948 |
| 2,842,583 | Meuly | July 8, 1958 |